United States Patent
Hubley

(10) Patent No.: US 6,250,246 B1
(45) Date of Patent: Jun. 26, 2001

(54) BOAT HULL SYSTEM

(76) Inventor: Darryl W. Hubley, 73 Benson Drive, Sydney Nova Scotia (CA), B1S 2M2

( * ) Notice: Subject to any disclaimer, the term of this patent is extended or adjusted under 35 U.S.C. 154(b) by 0 days.

(21) Appl. No.: 09/621,478

(22) Filed: Jul. 21, 2000

(51) Int. Cl.[7] .................................................. B63B 1/32
(52) U.S. Cl. ........................................ 114/288; 114/291
(58) Field of Search .................................. 114/271, 274, 114/288, 289, 290, 291

(56) References Cited

U.S. PATENT DOCUMENTS

| | | | |
|---|---|---|---|
| 1,050,517 | * | 1/1913 | Chase ................................... 114/290 |
| 2,172,674 | * | 9/1939 | Frost ..................................... 114/291 |
| 3,191,572 | * | 6/1965 | Wilson .................................. 114/290 |
| 3,316,874 | * | 5/1967 | Canazzi ................................ 114/290 |
| 3,361,104 | * | 1/1968 | Glass .................................... 114/290 |
| 3,680,517 | | 8/1972 | Morrison . |
| 3,937,173 | | 2/1976 | Stuart . |
| 4,165,703 | | 8/1979 | Burg . |
| 4,231,314 | * | 11/1980 | Peters ................................... 114/291 |
| 4,393,802 | | 7/1983 | Rizzo . |
| 4,649,851 | * | 3/1987 | April .................................... 114/288 |
| 4,862,817 | * | 9/1989 | Hornsby, Jr. et al. ............... 114/288 |
| 4,993,349 | | 2/1991 | Solari . |
| 5,524,568 | | 6/1996 | Bobst . |

* cited by examiner

Primary Examiner—Stephen Avila

(57) ABSTRACT

A boat hull system for reducing the friction between boats and water. The boat hull system includes a boat with a front and a rear. Towards the front there is a hull with a forward portion that includes a width tapering smaller toward the front and towards the rear there is a rearward portion that includes a substantially uniform width between the forward portion and the rear. The hull includes a lower surface with a keel ridge. The forward portion is substantially smooth between the keel ridge and a lateral side of the lower surface. The lower surface of the rearward portion includes a plurality of strake ridges extending substantially parallel to the keel ridge, and includes at least two strake ridges on each lateral side of the keel ridge. The adjacent strake ridges define a channel therebetween. An air duct extends from the lower surface of the forward portion and the lower surface of the rearward portion for moving air between the forward and rearward portions. The air duct includes an entry opening in the lower surface of the forward portion and an exit opening in the lower surface of the rearward portion.

12 Claims, 3 Drawing Sheets

BOAT HULL SYSTEM

BACKGROUND OF THE INVENTION

1. Field of the Invention

The present invention relates to boat hull designs and more particularly pertains to a new boat hull system for reducing the friction between the hull of a boat and water.

2. Description of the Prior Art

The use of boat hull designs is known in the prior art. More specifically, boat hull designs heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,524,568; U.S. Pat. No. 4,393,802; U.S. Pat. No. 4,993,349; U.S. Pat. No. 3,937,173; U.S. Pat. No. 3,680,517; and U.S. Pat. No. 4,165,703.

While these devices fulfill their respective, particular objectives and requirements, the aforementioned patents do not disclose a new boat hull system. The inventive device includes a boat with a front and a rear. The boat has a hull with a forward portion towards the front that includes a width tapering smaller toward the front. Towards the rear of the boat there is a rearward portion of the hull that includes a substantially uniform width between the forward portion and the rear. Towards the front of the boat, the hull includes a lower surface with a keel ridge. The forward portion is substantially smooth between the keel ridge and a lateral side of the lower surface. The lower surface of the rearward portion includes a plurality of strake ridges extending substantially parallel to the keel ridge, and includes at least two strake ridges on each lateral side of the keel ridge. The adjacent strake ridges define a channel therebetween.

An air duct extends from the lower surface of the forward portion to the lower surface of the rearward portion for moving air between the forward and rearward portions. The air duct includes an entry opening in the lower surface of the forward portion and an exit opening in the lower surface of the rearward portion.

In these respects, the boat hull system according to the present invention substantially departs from the conventional concepts and designs of the prior art, and in so doing provides an apparatus primarily developed for the purpose of reducing the friction between boats and water.

SUMMARY OF THE INVENTION

In view of the foregoing disadvantages inherent in the known types of boat hull designs now present in the prior art, the present invention provides a new boat hull system construction wherein the same can be utilized for reducing the friction between boats and water.

The general purpose of the present invention, which will be described subsequently in greater detail, is to provide a new boat hull system apparatus and method which has many of the advantages of the boat hull designs mentioned heretofore and many novel features that result in a new boat hull system which is not anticipated, rendered obvious, suggested, or even implied by any of the prior art boat hull designs, either alone or in any combination thereof.

To attain this, the present invention generally comprises a boat with a front and a rear. The boat has a hull with a forward portion towards the front that includes a width tapering smaller toward the front. Towards the rear of the boat the hull has a rearward portion that includes a substantially uniform width between the forward portion and the rear.

Towards the front of the boat, the hull includes a lower surface with a keel ridge. The forward portion is substantially smooth between the keel ridge and a lateral side of the lower surface. The lower surface of the rearward portion towards the back of the boat includes a plurality of strake ridges extending substantially parallel to the keel ridge, and includes at least two strake ridges on each lateral side of the keel ridge. The adjacent strake ridges define a channel therebetween. An air duct extends from the lower surface of the forward portion to the lower surface of the rearward portion for moving air between the forward and rearward portions. The air duct includes an entry opening in the lower surface of the forward portion and an exit opening in the lower surface of the rearward portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new boat hull system apparatus and method which has many of the advantages of the boat hull designs mentioned heretofore and many novel features that result in a new boat hull system which is not anticipated, rendered obvious, suggested, or even implied by any of the prior art boat hull designs, either alone or in any combination thereof.

It is another object of the present invention to provide a new boat hull system which may be easily and efficiently manufactured and marketed.

It is a further object of the present invention to provide a new boat hull system which is of a durable and reliable construction.

An even further object of the present invention is to provide a new boat hull system which is susceptible of a low cost of manufacture with regard to both materials and labor, and which accordingly is then susceptible of low prices of sale to the consuming public, thereby making such boat hull system economically available to the buying public.

Still yet another object of the present invention is to provide a new boat hull system which provides in the apparatuses and methods of the prior art some of the advantages thereof, while simultaneously overcoming some of the disadvantages normally associated therewith.

Still another object of the present invention is to provide a new boat hull system for reducing the friction between the hull of a boat and water.

Yet another object of the present invention is to provide a new boat hull system which includes a boat with an air duct that extends from the lower surface of the forward portion of the hull and the lower surface of the rearward portion of the hull for moving air between the forward and rearward portions.

Still yet another object of the present invention is to provide a new boat hull system that creates air pockets between the hull and water so that the boat moves more efficiently.

Even still another object of the present invention is to provide a new boat hull system that allows a boat to travel farther and faster.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
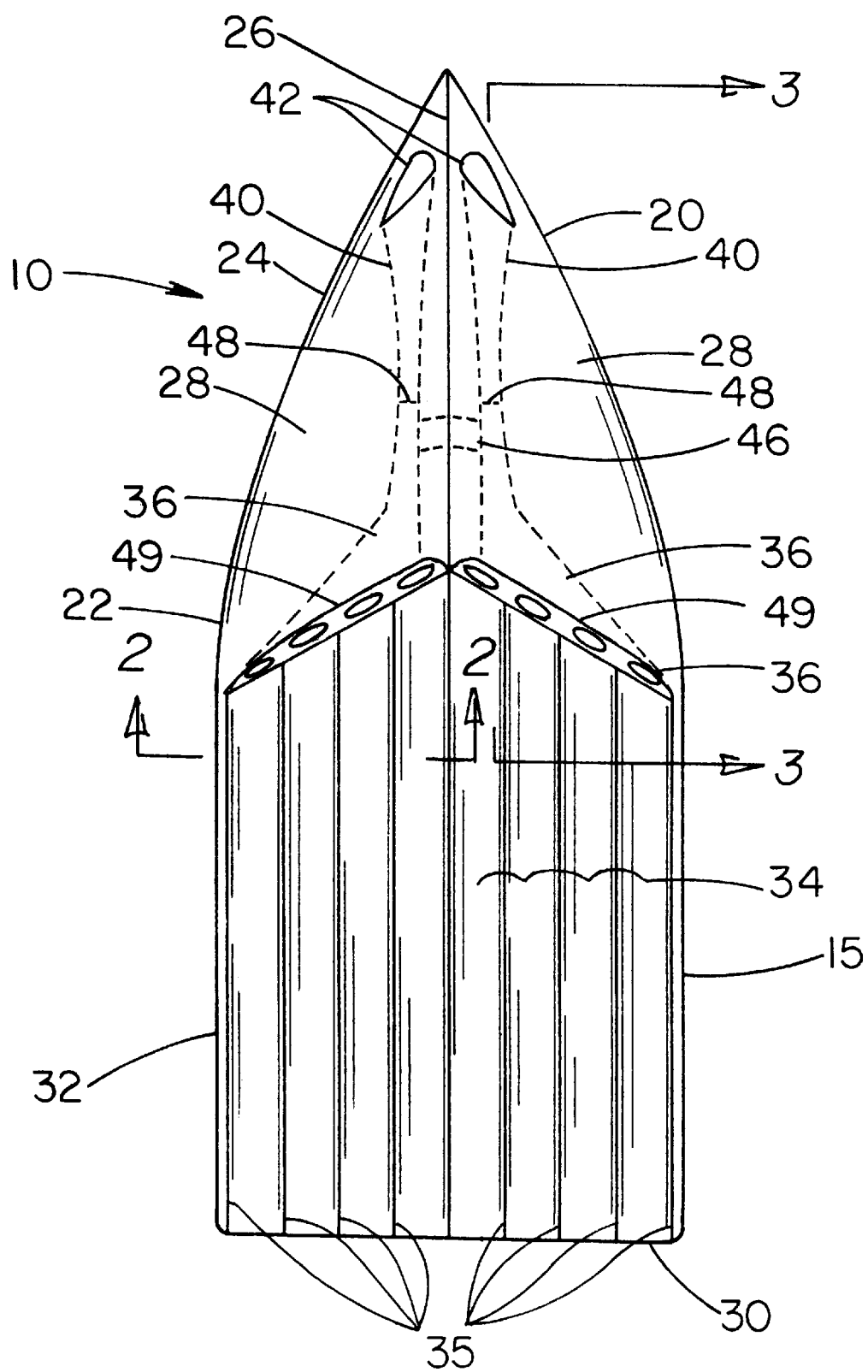
FIG. 1 is a schematic bottom view of a new boat hull system according the present invention.
Figure 2:
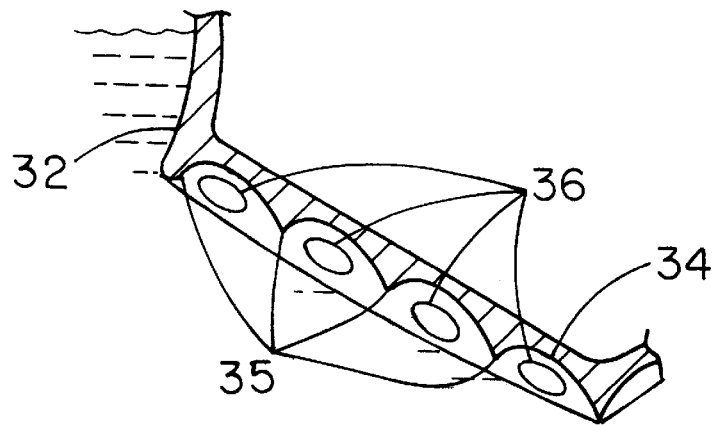
FIG. 2 is a schematic rear view taken along line 2—2 of FIG. 1 of the present invention.
Figure 3:
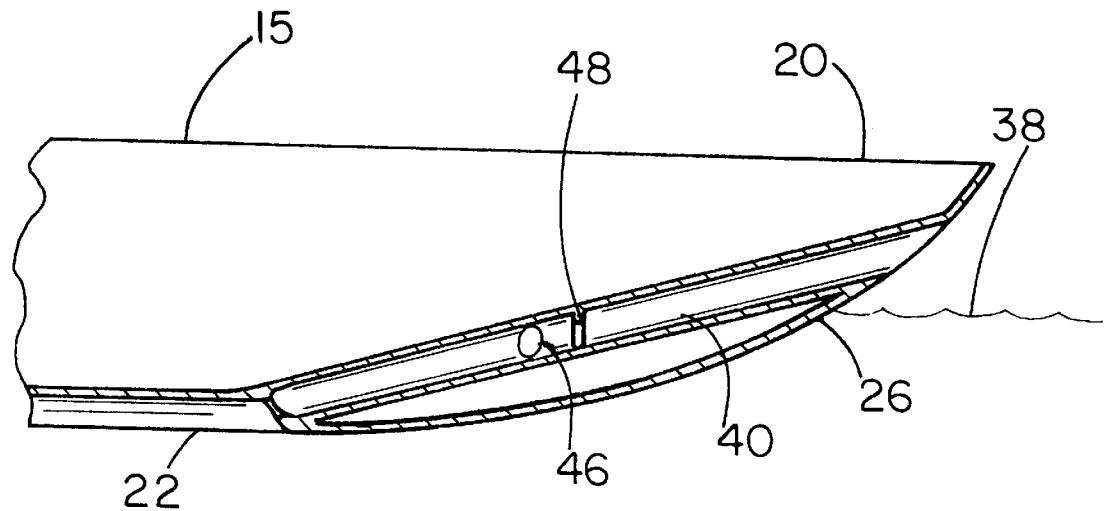
FIG. 3 is a schematic side view taken along line 3—3 of FIG. 1 of he present invention.
Figure 4:
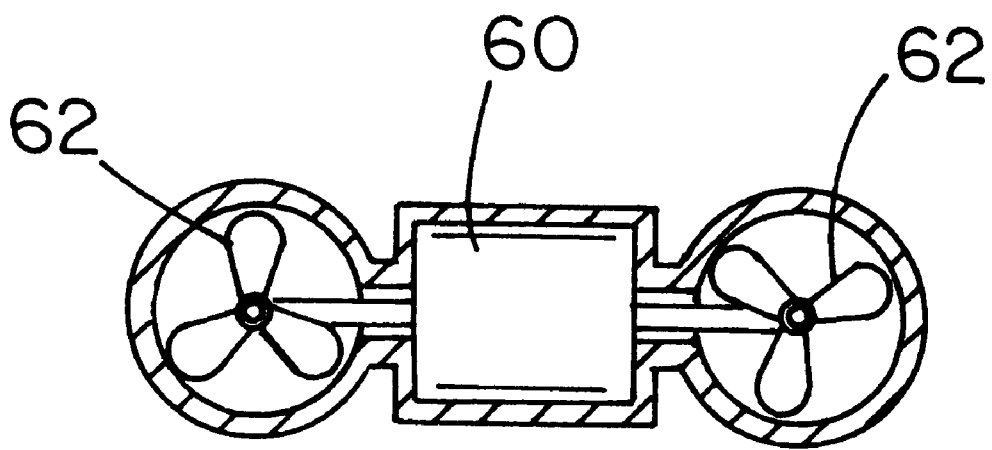
FIG. 4 is a schematic view of a portion of an optional embodiment of the present invention, particularly illustrating a fan mounted in each of the air ducts and a motor for rotating the fans.

With reference now to the drawings, and in particular to FIGS. 1 through 4 thereof, a new boat hull system embodying the principles and concepts of the present invention and generally designated by the reference numeral 10 will be described.

As best illustrated in FIGS. 1 through 4, the boat hull system 10 generally comprises a boat 15 that includes a front 20 and a rear 30. The boat has a hull 22 that includes a forward portion 24 toward the front 20 of the boat 15 and a rearward portion 32 toward the rear 30 of the boat 15. The forward portion 24 includes a width tapering smaller toward the front 20. The rearward portion 32 includes a substantially uniform width between the forward portion 24 and the rear 30.

The hull 22 includes a lower surface with a keel ridge 26. Towards the front 20 of the boat 15, the lower surface of the forward portion 24 is substantially smooth between the keel ridge 26 and a lateral side 28 of the lower surface. Towards the rear 30 of the boat 15, the lower surface of the rearward portion 32 includes a plurality of strake ridges 35 extending substantially parallel to the keel ridge 26. At least two strake ridges 35 are on each lateral side 28 of the keel ridge 26. The adjacent strake ridges 35 define a channel 34 therebetween.

Significantly, an air duct 40 extends between the lower surface of the forward portion 24 and the lower surface of the rearward portion 32 for moving air between the forward and rearward portions 32. The air duct 40 includes an entry opening 42 in the lower surface of the forward portion 24 and an air exit opening 36 in the lower surface of the rearward portion 32. The air duct 40 extends through an interior of the boat hull and has a closed perimeter along substantially the entire extent between the entry opening 42 and the air exit opening 36.

The entry opening 42 of the air duct 40 is located on the forward portion 24 toward the front 20 of the boat 15. The entry opening 42 may have a substantially teardrop shape with sides diverging toward the front 20 of the boat 15 and converging to a point toward the rear 30 of the boat 15. Further, the entry opening 42 is positioned above a waterline 38 of the hull 22.

The air exit 36 is located on the rearward portion 32 toward the forward portion 24 of the hull 22. The air duct 40 has an air exit opening 36 positioned in front 20 of each of the channels 34 between the strake ridges 35 such that air flowing through the air duct 40 exits into the channel 34. A rearward end of the air duct 40 forms a manifold 49 in communication with each of the exit openings 36.

Most preferably, the boat 15 includes a pair of the air ducts 40. One of the air ducts 40 is positioned on each side of the keel ridge 26 of the lower surface. A balance duct 46 extends between and in communication with the air ducts 40 for permitting equalization of air pressure between the air ducts 40.

A check valve 48 is mounted in each of the air ducts 40 between the entry opening 42 and the balance duct 46 to permit air movement in a direction from the entry opening 42 to the air exit opening 36 and blocking air movement in a direction from the air exit opening 36 to the entry opening 42. When the check valve 48 is closed by a lack of incoming air pressure between the entry opening 42 and the check valve 48, the balance duct 46 serves to supply air from the other of the air ducts 40.

Optionally, a propeller 62 may be positioned inside one or both of the air ducts 40 for assisting in propelling air through the air ducts 40 of the present invention. A motor 60 may be provided to rotate the propellers.

In use, the air forced through into the entry openings of the air ducts by movement of the boat is distributed by the exit openings into the channels, and bubbles of air are moved between the hull and the surface of the water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A boat hull system comprising:
    a boat having a front and a rear, a hull with a forward portion toward the front and a rearward portion toward the rear, the forward portion having a width tapering smaller toward the front, the rearward portion having a substantially uniform width between the forward portion and the rear, the hull having a lower surface with a keel ridge, the lower surface of the forward portion being substantially smooth between the keel ridge and a lateral side of the lower surface, the lower surface of the rearward portion having a plurality of strake ridges extending substantially parallel to the keel ridge, the lower surface having at least two strake ridges on each lateral side of the keel ridge, adjacent strake ridges defining a channel therebetween; and
    an air duct extending between the lower surface of the forward portion and the lower surface of the rearward portion for moving air between the forward and rearward portions, the air duct having an entry opening in the lower surface of the forward portion and an exit opening in the lower surface of the rearward portion.

2. The boat hull system of claim 1 wherein the air duct has a closed perimeter along substantially the entire extent between the entry opening and the exit opening.

3. The boat hull system of claim 1 wherein the entry opening of the air duct is located on the forward portion toward the front of the boat, and the exit opening of the air duct is located on the rearward portion toward the forward portion of the hull.

4. The boat hull system of claim 1 wherein the entry opening of the air duct has a substantially teardrop shape with sides diverging toward the front of the boat and converging to a point toward the rear of the boat.

5. The boat hull system of claim 1 wherein the entry opening of the air duct is positioned above a waterline of the hull.

6. The boat hull system of claim 1 wherein the boat includes a pair of air ducts with one of the air ducts positioned on each side of the keel ridge of the lower surface.

7. The boat hull system of claim 6 additionally comprising a balance duct extending between and in communication with the air ducts for permitting equalization of air pressure between the air ducts.

8. The boat hull system of claim 7 additionally comprising a check valve being mounted in each of the air ducts between the entry opening and the balance duct for permitting air movement in a direction from the entry opening to the exit opening and blocking air movement in a direction from the exit opening to the entry opening.

9. The boat hull system of claim 1 wherein the air duct has an exit opening positioned forward of at least one of the channels between the strake ridges.

10. The boat hull system of claim 1 wherein an exit opening is positioned in front of each of at least two of the channels between the strake ridges such that air flowing through the air duct exits into the channel, a rearward end of the air duct forming a manifold in communication with each of the exit openings.

11. The boat hull system of claim 1 wherein an exit opening is positioned in front of each of the channels between the strake ridges such that air flowing through the air duct exits into the channel, a rearward end of the air duct forming a manifold in communication with each of the exit openings.

12. A boat hull system comprising:
    a boat having a front and a rear, a hull with a forward portion toward the front and a rearward portion toward the rear, the forward portion having a width tapering smaller toward the front, the rearward portion having a substantially uniform width between the forward portion and the rear, the hull having a lower surface with a keel ridge, the lower surface of the forward portion being substantially smooth between the keel ridge and a lateral side of the lower surface, the lower surface of the rearward portion having a plurality of strake ridges extending substantially parallel to the keel ridge, the lower surface having at least two strake ridges on each lateral side of the keel ridge, adjacent strake ridges defining a channel therebetween;
    an air duct extending between the lower surface of the forward portion and the lower surface of the rearward portion for moving air between the forward and rearward portions, the air duct having an entry opening in the lower surface of the forward portion and an exit opening in the lower surface of the rearward portion, the air duct having a closed perimeter along substantially the entire extent between the entry opening and the exit opening, the entry opening being located on the forward portion toward the front of the boat, the exit opening being located on the rearward portion toward the forward portion of the hull,
    wherein the entry opening of the air duct has a substantially teardrop shape with sides diverging toward the front of the boat and converging to a point toward the rear of the boat, wherein the entry opening is positioned above a waterline of the hull;
    wherein the boat includes a pair of air ducts with one of the air ducts positioned on each side of the keel ridge of the lower surface, a balance duct extending between and in communication with the air ducts for permitting equalization of air pressure between the air ducts, a check valve being mounted in each of the air ducts between the entry opening and the balance duct for permitting air movement in a direction from the entry opening to the exit opening and blocking air movement in a direction from the exit opening to the entry opening; and
    wherein the air duct has an exit opening positioned in front of each of the channels between the strake ridges such that air flowing through the air duct exits into the channel, a rearward end of the air duct forming a manifold in communication with each of the exit openings.

* * * * *